US008436276B2

(12) United States Patent
Bradley et al.

(10) Patent No.: US 8,436,276 B2
(45) Date of Patent: May 7, 2013

(54) PORTABLE CUTTING DEVICE FOR BREACHING A BARRIER

(75) Inventors: Timothy Bradley, Loogootee, IN (US); Eric Hillenbrand, Evansville, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 767 days.

(21) Appl. No.: 12/511,056

(22) Filed: Jul. 28, 2009

(65) Prior Publication Data

US 2011/0024403 A1 Feb. 3, 2011

(51) Int. Cl.
*B23K 26/38* (2006.01)

(52) U.S. Cl.
USPC ................................... 219/121.67

(58) Field of Classification Search ......... 219/121.63–121.72, 121.83
See application file for complete search history.

(56) References Cited

U.S. PATENT DOCUMENTS

| | | | | |
|---|---|---|---|---|
| 3,392,259 A | * | 7/1968 | Meier | 219/121.6 |
| 3,622,743 A | * | 11/1971 | Muncheryan | 219/121.63 |
| 4,177,580 A | * | 12/1979 | Marshall et al. | 434/22 |
| 4,564,736 A | * | 1/1986 | Jones et al. | 219/121.6 |
| 4,580,557 A | * | 4/1986 | Hertzmann | 606/12 |
| 5,142,288 A | | 8/1992 | Cleveland | |
| 5,272,716 A | * | 12/1993 | Soltz et al. | 372/109 |
| 5,401,171 A | | 3/1995 | Paghidiwala | |
| 5,501,680 A | * | 3/1996 | Kurtz et al. | 606/9 |
| 5,694,408 A | * | 12/1997 | Bott et al. | 372/6 |
| 5,780,807 A | | 7/1998 | Saunders | |
| 6,187,213 B1 | * | 2/2001 | Smith et al. | 216/28 |
| 6,269,617 B1 | * | 8/2001 | Blanchard | 56/1 |
| 6,439,888 B1 | | 8/2002 | Boutoussov et al. | |
| 6,593,540 B1 | * | 7/2003 | Baker et al. | 219/121.63 |
| 6,670,222 B1 | * | 12/2003 | Brodsky | 438/118 |
| 6,700,094 B1 | * | 3/2004 | Kuntze | 219/121.6 |
| 6,703,582 B2 | * | 3/2004 | Smart et al. | 219/121.62 |
| 7,397,014 B2 | * | 7/2008 | Hart et al. | 219/121.68 |
| 7,540,227 B2 | | 6/2009 | McCants, Jr. | |
| 7,683,310 B1 | | 3/2010 | Sinclair et al. | |
| 8,202,268 B1 | * | 6/2012 | Wells et al. | 606/10 |
| 2002/0190162 A1 | | 12/2002 | McDonnell | |
| 2004/0128932 A1 | | 7/2004 | Estape | |
| 2006/0000988 A1 | | 1/2006 | Stuart et al. | |
| 2007/0034615 A1 | * | 2/2007 | Kleine | 219/121.72 |
| 2008/0144673 A1 | | 6/2008 | Gapontsev | |
| 2009/0092157 A1 | | 4/2009 | Gapontsev | |
| 2009/0122816 A1 | | 5/2009 | Wagner et al. | |
| 2010/0076475 A1 | * | 3/2010 | Yates et al. | 606/170 |
| 2010/0176097 A1 | * | 7/2010 | Zhu | 219/121.63 |
| 2010/0183037 A1 | | 7/2010 | Furuya et al. | |

FOREIGN PATENT DOCUMENTS

WO WO 99/07439 2/1999
WO WO 2006/031351 3/2006

OTHER PUBLICATIONS

Galvanauskas et al., "KW-Power Fiber Lasers with Single Transverse Mode Output," Sep. 22, 2005, 5 pgs., downloaded from http://www.nufern.com/whitepaper_detail.php/30.

(Continued)

*Primary Examiner* — Samuel M Heinrich
(74) *Attorney, Agent, or Firm* — Christopher A. Monsey

(57) ABSTRACT

A portable cutting device is disclosed. The portable cutting device may include a portable power supply and a laser source. The portable power supply may be a lithium ion battery pack. The laser source may be a Ytterbium Fiber laser. The portable power supply and laser source of the portable cutting device may be positioned within a backpack and carried by a user. A handheld unit which is coupled to the laser source may be supported by the hands of the operator. The handheld unit provides power generated by the laser source to a barrier to be cut.

46 Claims, 11 Drawing Sheets

OTHER PUBLICATIONS

Peavey et al., "Comparison of Cortical Bone Ablations by Using Infrared Laser Wavelengths 2.9 to 9.2 μm," Lasers in Surgery and Medicine, vol. 26, pp. 421-434, 1999.

Valentine, "COTS laser technology targets emerging battlefield threats," RF Design, Nov. 29, 2007, 2 pgs., downloaded on Jun. 27, 2009 from www.printthis.clickabiliyt.com/pt/cpt?action=cpt&title=COTTS+Laser+Technology+.

Waarts et al., "Fiber Lasers at JDS Uniphase," Fiber Lasers: Technology, Systems, and Applications, Proc. of Society of Photo-Opitcal Instrumentation Engineers, 2004, vol. 5335, 12 pgs.

* cited by examiner

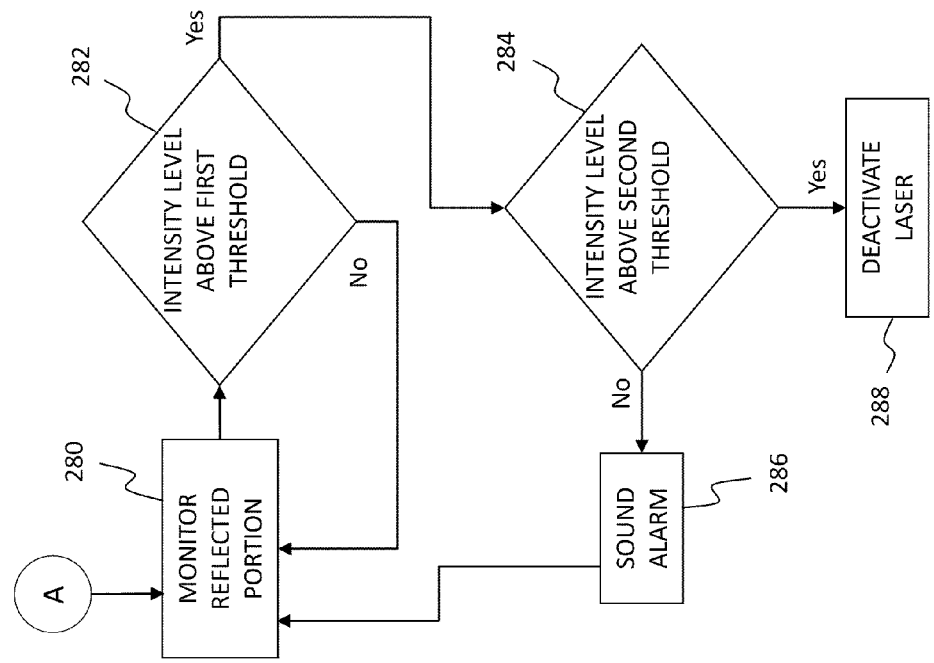
FIG. 7
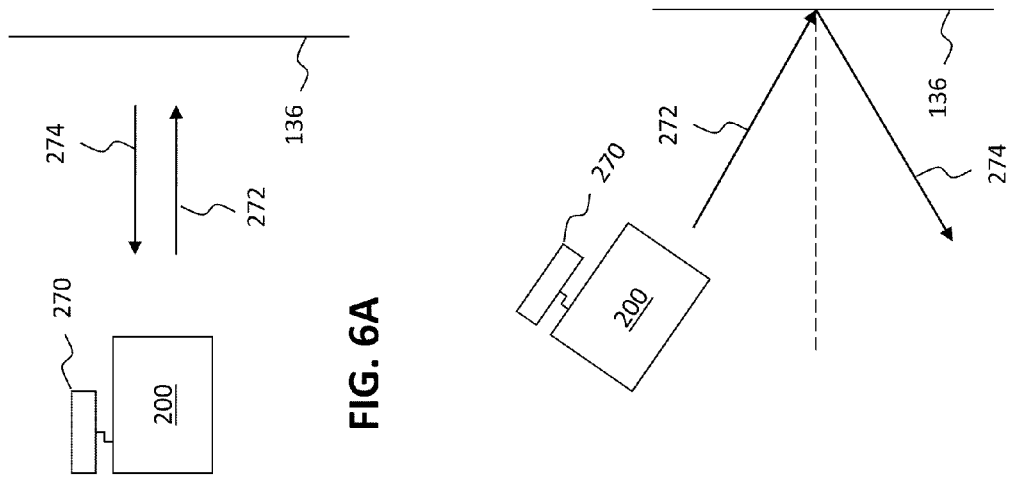
FIG. 6A
FIG. 6B

PORTABLE CUTTING DEVICE FOR BREACHING A BARRIER

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon.

BACKGROUND OF THE INVENTION

The present invention relates generally to devices for cutting through a barrier and, more particularly, to portable devices which are capable of breaching a barrier.

Often times law enforcement, military personnel, fire personnel, and other types of rescue personnel need to open or otherwise cross a barrier. Exemplary barriers include doors, walls, and other impediments to advancement. Often times this requires the barrier to be altered to permit passage.

Often these personnel are working in confined areas and do not have access to large units which can assist in the breaching of a barrier. A need exists for a portable unit which can be carried by a person and which is capable providing enough power to effectively breach a barrier.

SUMMARY OF THE INVENTION

In an exemplary embodiment of the present disclosure, a portable cutting device is disclosed. In another exemplary embodiment of the present disclosure, a method of using a portable cutting device is disclosed.

In a further exemplary embodiment of the present disclosure, a portable cutting device for transport by a human operator is provided. The portable cutting device comprising: a laser source which provides optical energy; a battery power source; a laser directing device supporting focusing optics which focus the optical energy provided by the laser source; at least one storage container, the at least one storage container housing the laser source and the battery power source; and a flexible optical conduit extending from an interior of the at least one storage container to the handheld laser directing device. The optical conduit communicates the optical energy produced by the laser source to the handheld laser directing device.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings.

FIG. 6A illustrates a first positioning of the laser directing device relative to the barrier;

FIG. 6B illustrates a second positioning of the laser directing device relative to the barrier;

FIG. 7 illustrates a processing sequence of a controller of the portable cutting device;

Figure 1:
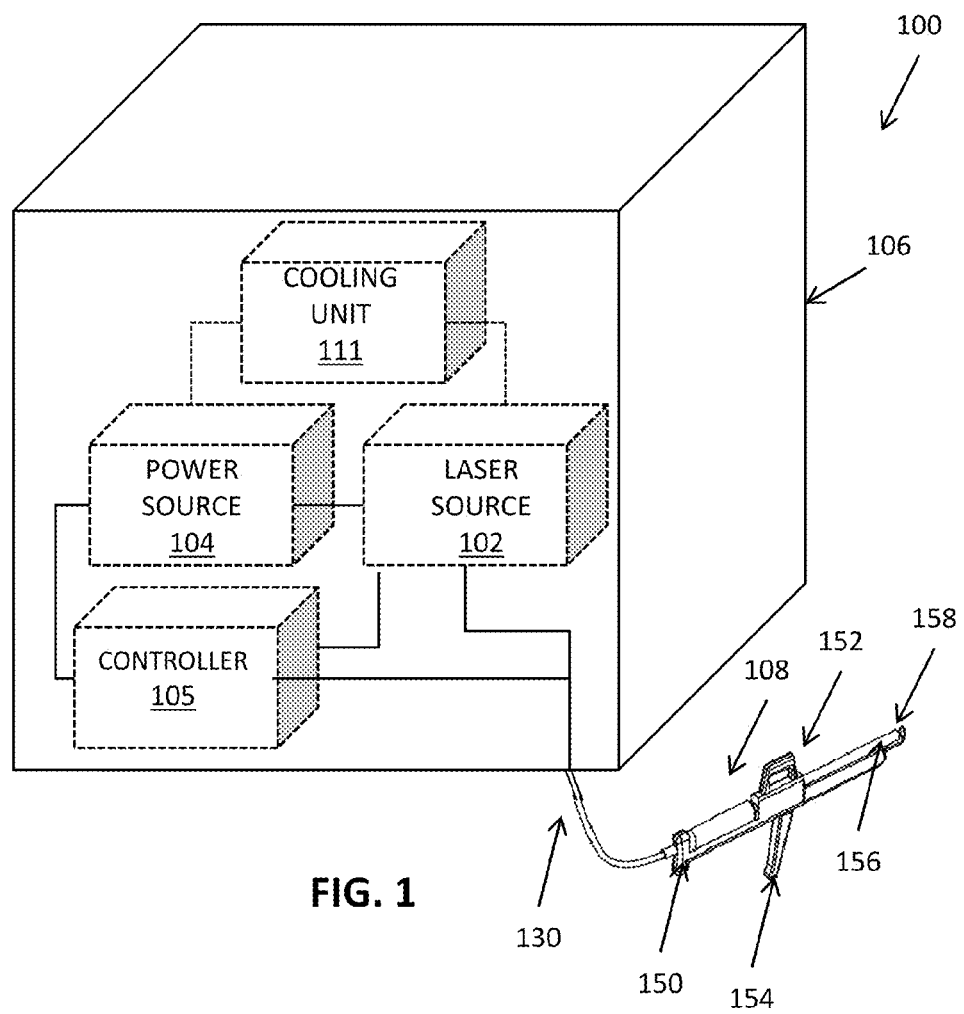
FIG. 1 is a representative view of a portable cutting device.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Referring to FIG. 1, a portable cutting device 100 is shown. The portable cutting device 100 includes a laser source 102, a power supply 104, a storage container 106, and a laser directing device 108. A cooling unit 111 may optionally be provided to actively cool one or both of laser source 102 and power supply 104. In one embodiment, cooling unit 111 is an air-cooled chiller. In one embodiment, cooling unit 111 is a thermo-electric cooling system. In one embodiment, cooling unit 111 is an on-demand cooler which directs cooling air at the optical coupler which couples laser source 102 to optical conduit 130. The on-demand cooler may be manually activated or activated based on a monitored temperature sensor value. The cooling air of the on-demand cooler is a non-flammable gas.

Figure 2:
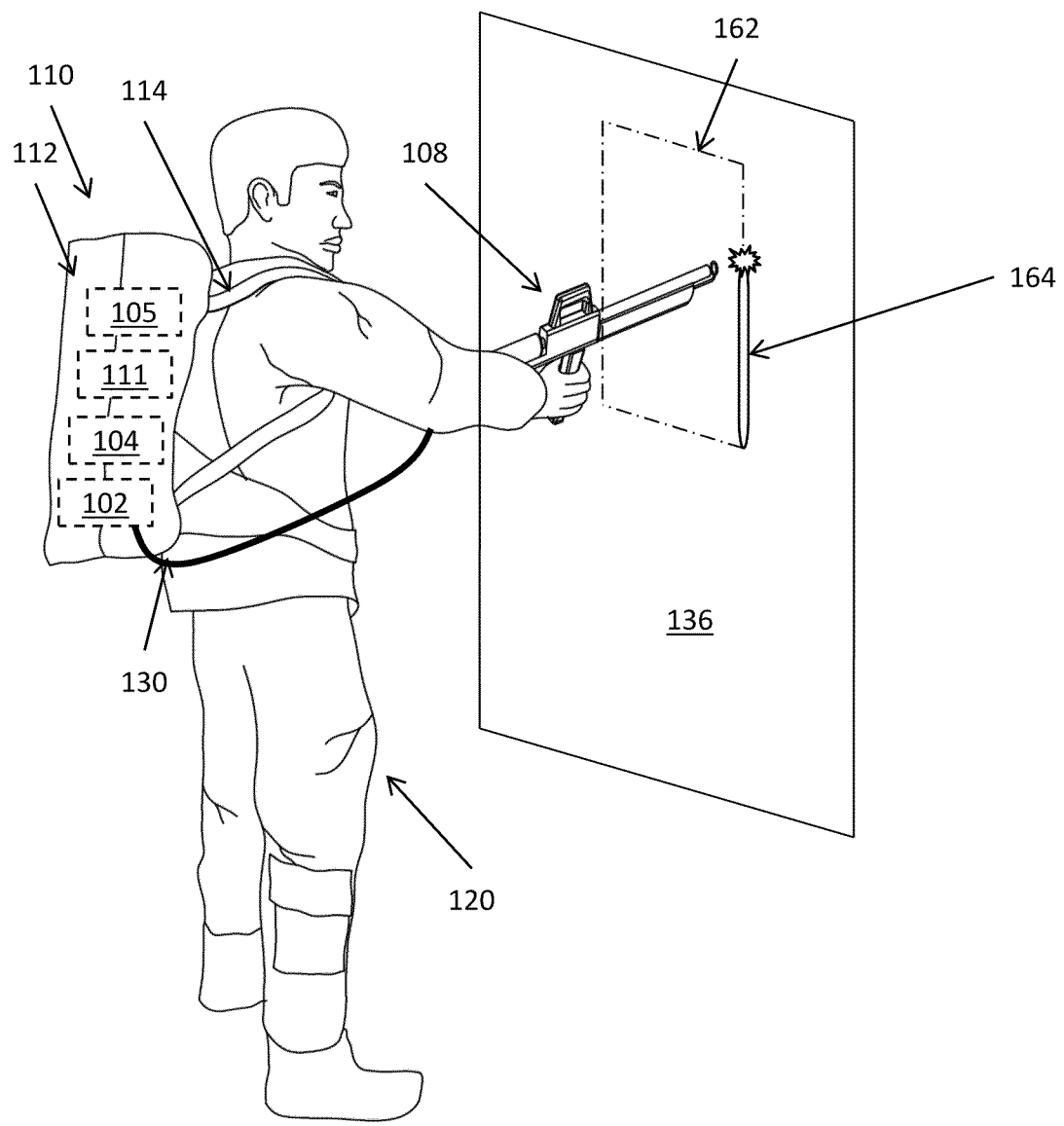
FIG. 2 shows the portable cutting device of FIG. 1 being used to breach a barrier.

In one embodiment, storage container 106 is a backpack, such as backpack 110 shown in FIG. 2. Backpack 110 is worn by a human operator 120. Backpack 110 includes a cargo carrying portion 112 and two straps 114 which are positioned over the shoulders of the human operator 120 and extend under the arms of the human operator 120. Backpack 110 is positioned on the back side of the human operator 120. In one embodiment, storage container 106 is positioned on a front side of the human operator 120. In one embodiment, storage container 106 is positioned to either a left side or a right side of the human operator 120. In one embodiment, storage container 106 is positioned on at least two of a back side, a left side, a front side, and a right side of the human operator 120.

Figure 2A:
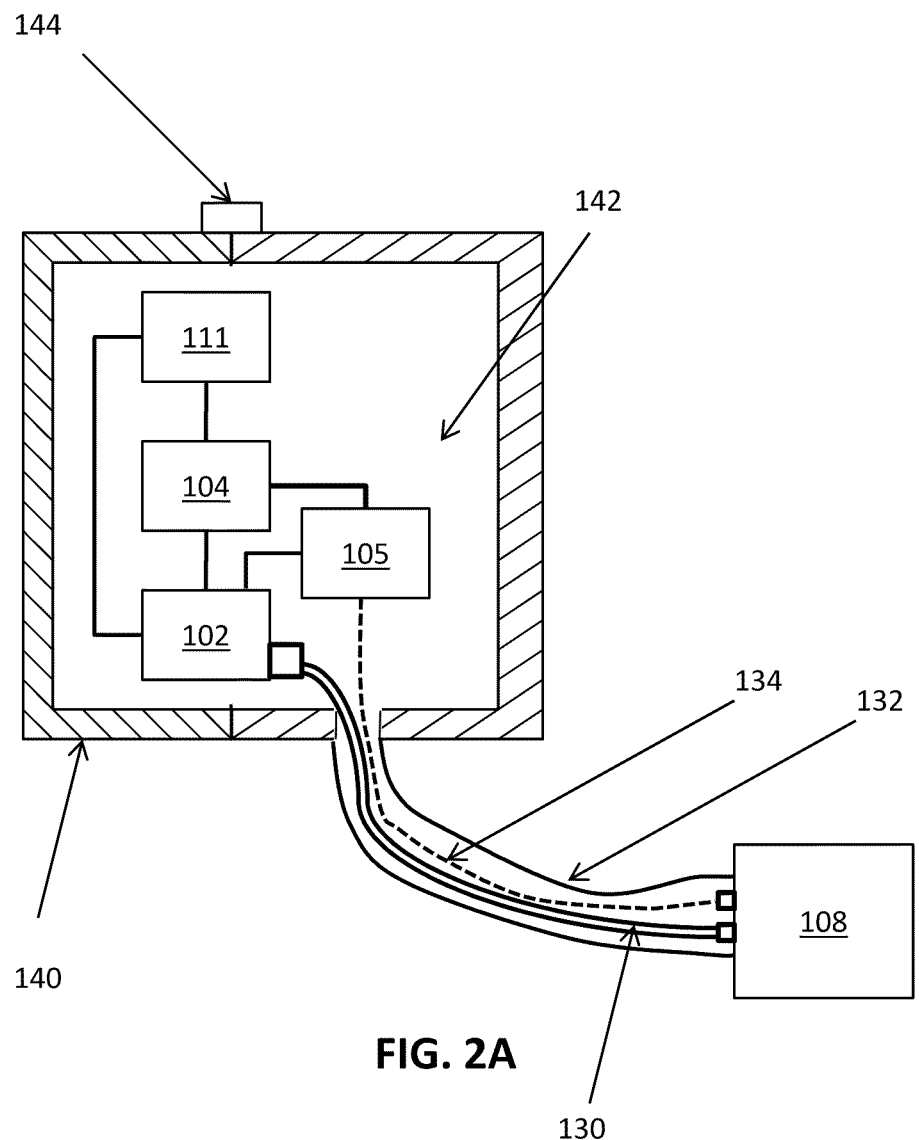
FIG. 2A is a representative view of the cargo carrying portion of the backpack shown in FIG. 2.

In one embodiment, laser source 102, power supply 104, and controller 105 are positioned within cargo carrying portion 112 of backpack 110 for transport by human operator 120. Referring to FIG. 2A, cargo carrying portion 112 is represented. Cargo carrying portion 112 includes a first portion 140 and a second portion 142 which cooperate to form an interior space of cargo carrying portion 112. In one embodiment, cargo carrying portion 112 is made of a flexible material and first portion 140 and second portion 142 are secured together with one or more suitable fasteners 144. Exemplary fasteners include zippers, snaps, and other suitable fasteners. In one embodiment, first portion 140 and second portion 142 are integrally formed and are seperatable only along a portion, such as the left side, top side, and right side. In one embodiment, cargo carrying portion 112 is a hard case and first portion 140 and second portion 142 are secured together with one or more suitable fasteners 144. Exemplary fasteners include latches and other suitable fasteners. Regardless of the configuration, first portion 140 and second portion 142 cooperate to provide a closed space for carrying laser source 102, power supply 104, controller 105, and, optionally, cooling unit 111 during transport and the ability to open at least a portion of cargo carrying portion 112 to access laser source 102, power supply 104, controller 10, or cooling unit 111, such as to replace the batteries of power supply 104.

Laser directing device 108 is held by the human operator 120. Laser directing device 108 includes a stock portion 150 which may be positioned next to the shoulder of human operator 120. Laser directing device 108 also includes a handle 152 whereby the hand of the operator may carry laser directing device 108 and a grip 154 which human operator 120 may grasp during operation of portable cutting device 100.

Laser directing device 108 is coupled to laser source 102 through an optical conduit 130. Exemplary optical conduits include fiber optic cable. Laser directing device 108 also includes an optical conduit 156 which is coupled to optical conduit 130. Optical energy generated by laser source 102 travels through optical conduit 130 and optical conduit 156 and is discharged through an end 158 of laser directing device 108 towards a barrier 136 (see FIG. 2). The energy discharged by laser directing device 108 is of sufficient strength to cut the material of barrier 136. Laser directing device 108 includes an optical system 210 which shapes the energy exiting optical conduit 156 of laser directing device 108 to focus it at a focus 214. Focusing optics 160 concentrate the energy onto a defined location on the barrier 136.

Returning to FIG. 2A, optical conduit 130 is coupled to laser source 102 at a location in the interior of cargo carrying portion 112. Optical conduit 130 extends through a wall of cargo carrying portion 112 and is coupled to laser directing device 108 outside of storage container 106 at optical connector 206 (see FIG. 5). In one embodiment, optical conduit 130 couples to laser directing device 108 through grip 154.

Optical conduit 130 is provided in a protective sheath 132. The protective sheath 132 should have a high thermal conductivity and limit a bend radius of optical conduit 130. In one embodiment, protective sheath 132 is made of segmented pieces of metal coupled together. Also included with protective sheath 132 is an electrical control and signal cable 134 which couples controller 105 with components of laser directing device 108. In one embodiment, controller 105 is coupled to a controller 230 of laser directing device 108. In one embodiment, controller 105 is coupled to controller 230 over through a standard RS-232 or RS-422 interface. In one embodiment, signal cable 134 is an optical fiber and controller 105 communicates with controller 230 via any type of standard protocol, such as Internet protocol. As explained herein, controller 230 interfaces with the operator 120, the components of laser directing device 108, and monitors sensors associated with laser directing device 108. Controller 230 then communicates this information to controller 105 which controls the operation of laser source 102.

Laser source 102, in one embodiment, is a continuous wave laser. In one embodiment, laser source 102 is a fiber laser. In one embodiment, laser source 102 is a continuous wave Ytterbium single mode fiber laser. Exemplary continuous wave single mode fiber lasers are provided by IPG Laser GmBH located at 50 Old Webster Road in Oxford, Mass. 01540. Details regarding an exemplary laser source 102 are provided in U.S. patent application Ser. No. 11/973,437, titled POWERFUL FIBER LASER SYSTEM, assigned to IPG Photonics Corporation, the disclosure of which is expressly incorporated by reference herein. Details regarding an exemplary laser source 102 are provided in U.S. patent application Ser. No. 11/611,247, titled FIBER LASER WITH LARGE MODE AREA FIBER, assigned to IPG Photonics Corporation, the disclosure of which is expressly incorporated by reference herein. In one embodiment, laser source 102 is a solid state laser.

Figure 11:
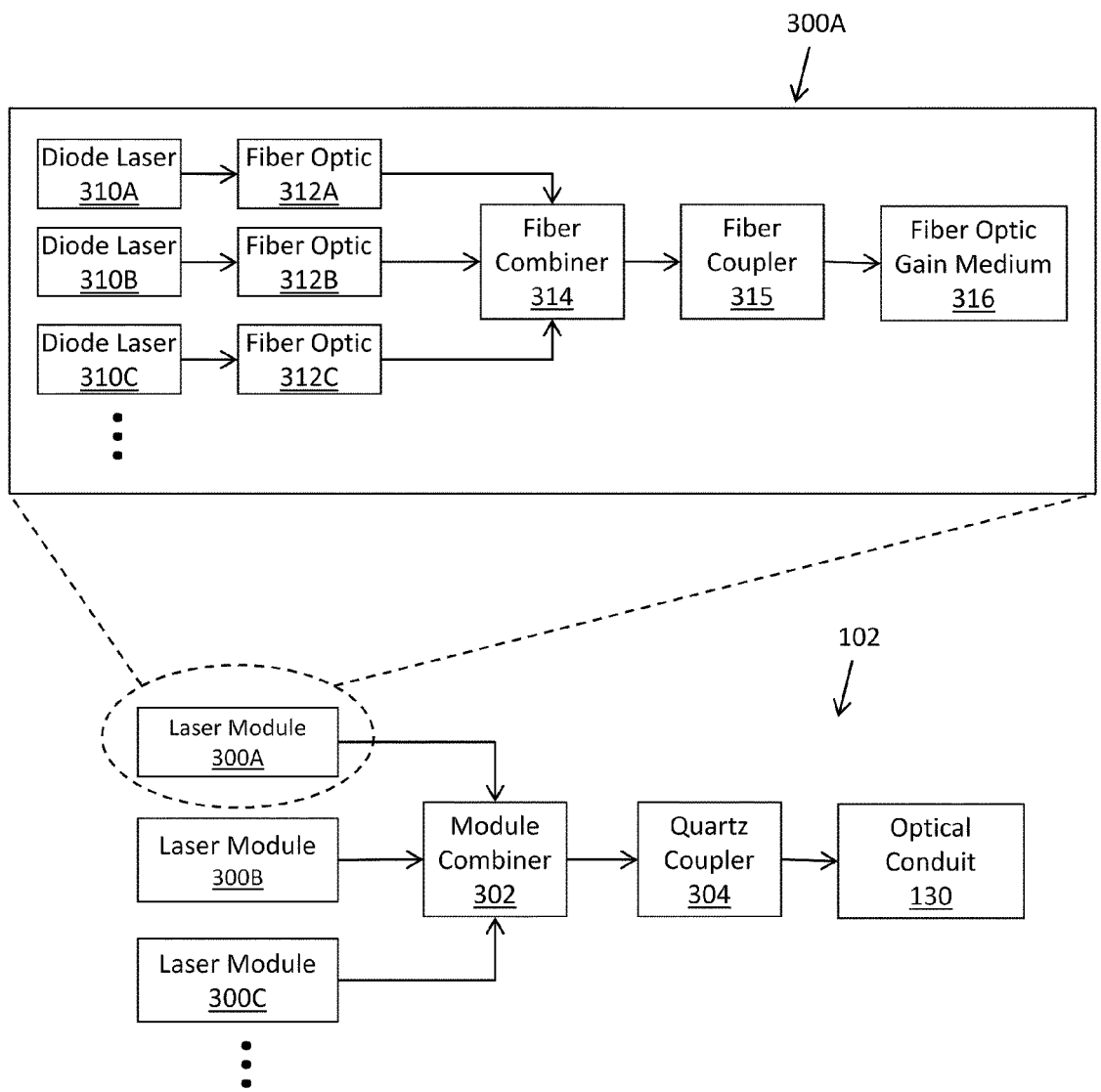
FIG. 11 illustrates an exemplary laser source.

Referring to FIG. 11, an exemplary configuration of laser source 102 is shown. Laser source 102 includes a plurality of individual modules 300 each of which provide a single mode 1.07 micrometer output beam. The output of each of modules 300 is combined together through a module combiner 302 which brings the energy together in a single beam. This combined beam is coupled to optical conduit 130 through a quartz coupler 304. Although three laser modules 300 are illustrated any number of laser modules 300 may be included.

The components of a given laser module 300 are also shown in FIG. 11. The laser module 300 includes a plurality of diode lasers 310 each of which are coupled into a respective Ytterbium fiber 312. The output of the Ytterbium fibers 312 are combined through a fiber combiner 314 which brings the energy together. This energy is fed through a coupler 315 into an Ytterbium fiber optic gain medium 316 which produces there from a single mode 1.07 micrometer output beam. Although three diode laser sets 310 are illustrated any number of diode laser sets 310 may be included.

In one embodiment, the power of laser source 102 is about 3 kilowatts. In one embodiment, the power level of laser source 102 is about 5 kilowatts. In one embodiment, the power level of laser source 102 is about 10 kilowatts. In one embodiment, the power level of laser source 102 is about 20 kilowatts. In one embodiment, the power level of laser source 102 is about 50 kilowatts. In one embodiment, the power level of laser source 102 is between about 3 kilowatts and 20 kilowatts. In one embodiment, the power level of laser source 102 is at least 3 kilowatts.

In one embodiment, power supply 104 is a portable power supply. An exemplary portable power supply is one or more batteries, such as rechargeable batteries. Exemplary rechargeable batteries include lithium-ion batteries and lithium polymer batteries. Exemplary lithium-ion batteries include commercially available cells, such as those available from A123 Systems located in Watertown, Mass. In one embodiment, the cells have a nominal amp-hour rating of 2.3 Ah and a nominal load voltage of 3.3 DCV/cell. Further exemplary lithium-ion batteries include commercially available cells available from SAFT America, Inc. located at 313 Crescent St Ne in Valdese, N.C. in Watertown, Mass. In one embodiment, the cells have a nominal maximum current of 500 Å, a specific power of 5.1 kW/kg, a specific energy of 430 kJ/kg, and a mass of 0.94 kg.

Figure 3:
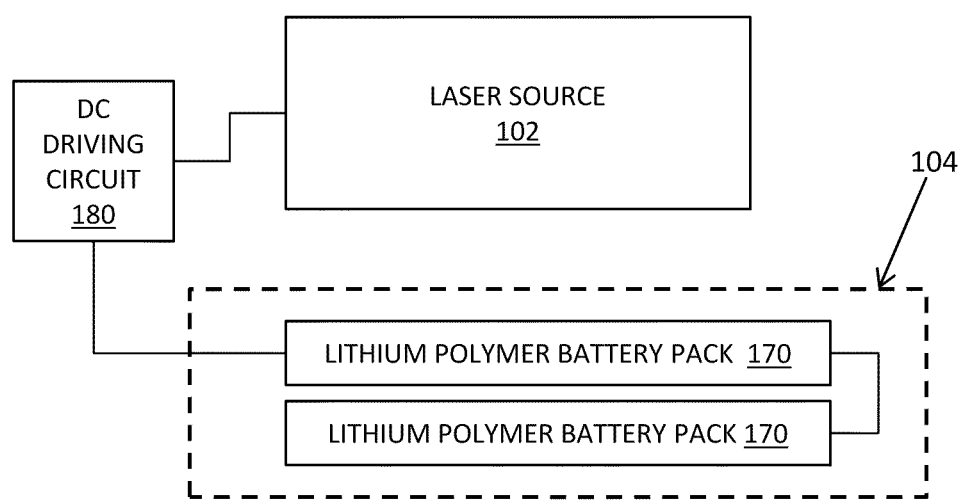
FIG. 3 is a representative view of an exemplary portable battery power supply.

Referring to FIG. 3, multiple lithium-ion battery packs 170 are coupled together in series to produce power supply 104. Each of lithium-ion battery pack 170 delivers about 5 kilowatts of power for about six minutes. Since two units are shown coupled together in FIG. 3, the resultant power supply 104 can deliver about 10 kilowatts of power. Each of lithium-ion battery pack 170 includes multiple individual lithium-ion batteries. In one embodiment, lithium-ion battery pack 170 commercially available cells available from A123 Systems located in Watertown, Mass. The two lithium-ion battery packs 170 together weigh about 28 pounds (13.6 kg).

Figure 4:
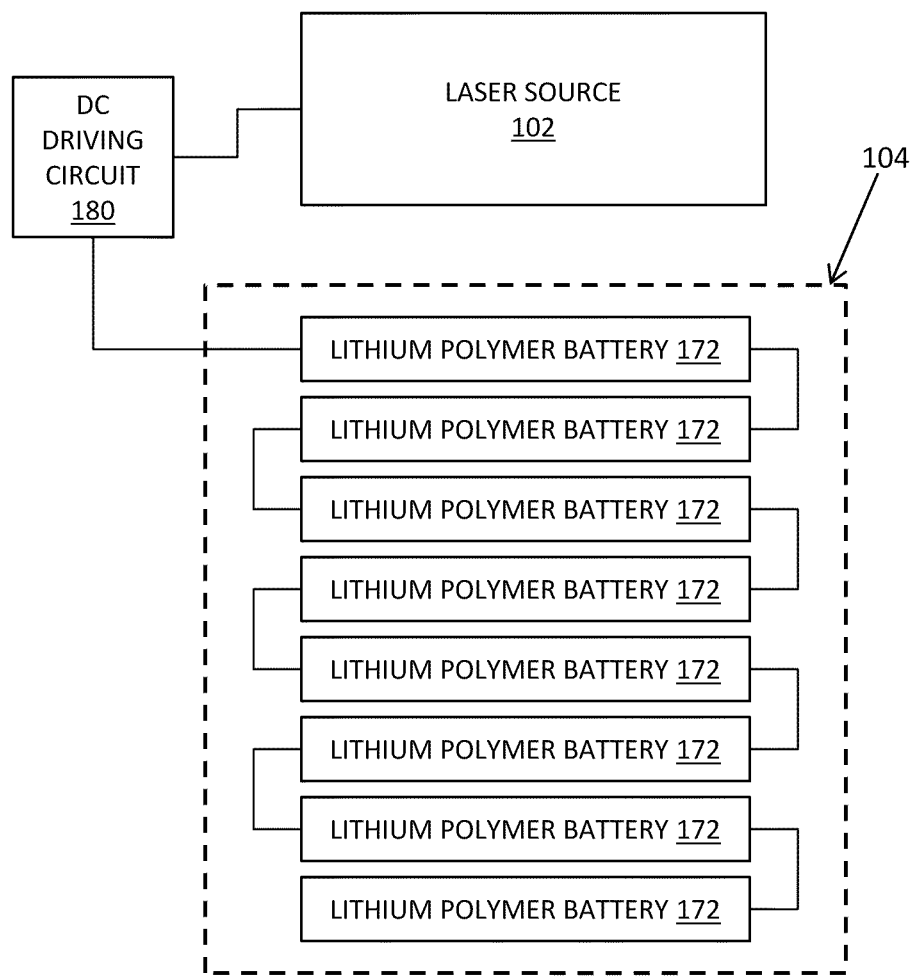
FIG. 4 is a representative view of an exemplary second portable battery power supply.

Referring to FIG. 4, multiple lithium polymer batteries 172 are coupled together in series to produce power supply 104. Each of lithium polymer batteries 172 delivers about 4.5 kilowatts of power for about two minutes. Since eight units are shown coupled together in FIG. 4, the resultant power supply 104 can deliver about 13 kilowatts of power for about six minutes. The eight lithium polymer batteries 172 together weigh about 21 pounds (9.6 kg).

In one embodiment, laser source 102 is a three kilowatt Yterrbium single mode fiber laser such as ones commercially available from IPG Photonics located at IPG Photonics Corporation, 50 Old Webster Road Oxford, Mass. 01540 USA and power supply 104 is as shown in FIG. 4. This combination results in portable cutting device 100 having a cutting speed of about fifty inches per minute for 0.5 inch thick steel. This combination may cut up to 300 inches of material on a single charge of power supply 104, arranged as shown in FIG. 4. In general, commercial laser sources include an AC-to-DC converter to convert power from an AC source to DC power for laser source 102. Since power supply 104 already provides DC power, when a commercial laser source is being used the AC-to-DC converter is removed and replaced with DC driving circuit 180. DC driving circuit 180 provides power from power supply 104 to laser source 102 and regulates the power level provided. In a similar fashion, commercial laser sources often include cooling lines to cool the laser source and over-temperature sensors to monitor the temperature of the laser source. In one embodiment, when a commercial laser source is being used the cooling lines are removed and the over-temperature sensors of the commercial laser source are overridden. With this arrangement and using the laser directing device 108 represented in FIG. 5, laser directing device 108 was operated at 3 kW power for 120 seconds without disabling the laser source 102.

Figure 9:
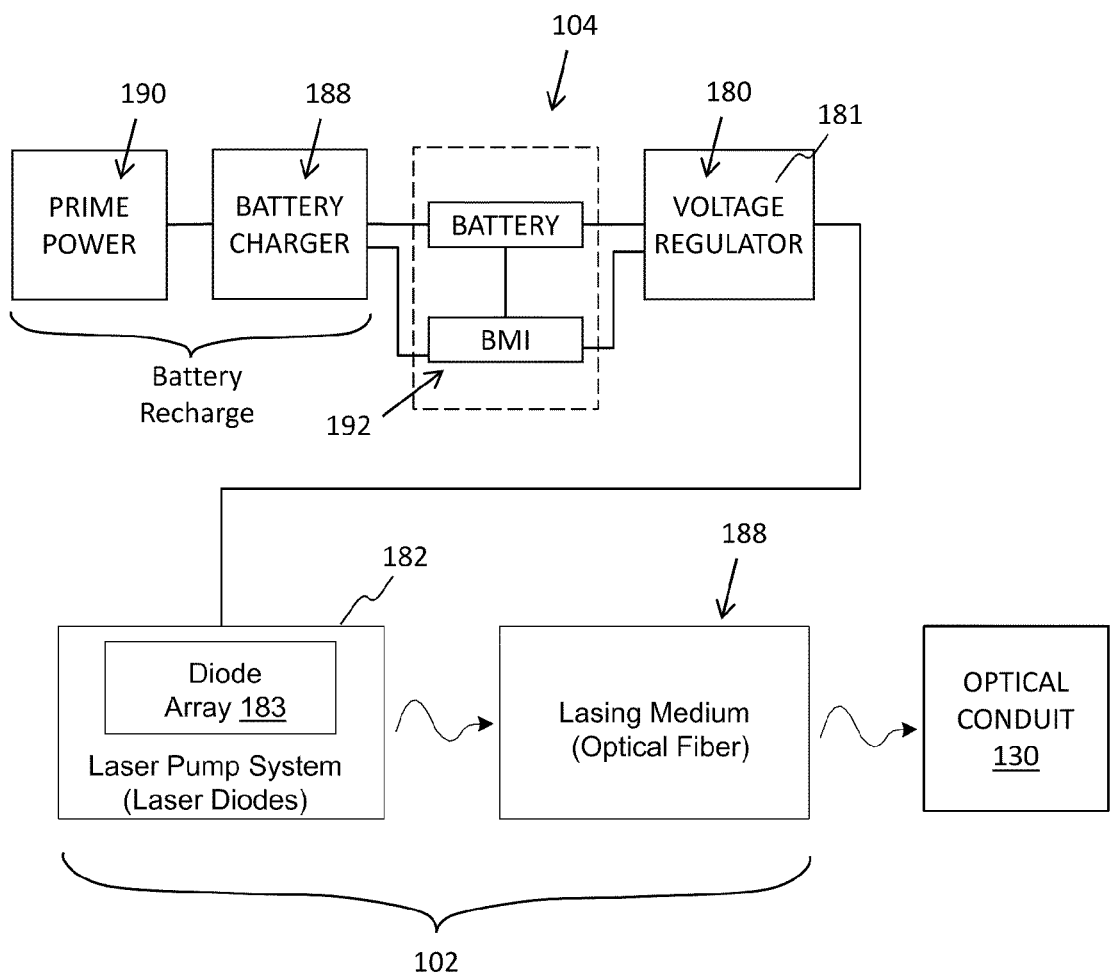
FIG. 9 illustrates a first arrangement of components of the portable cutting device.
Figure 10:
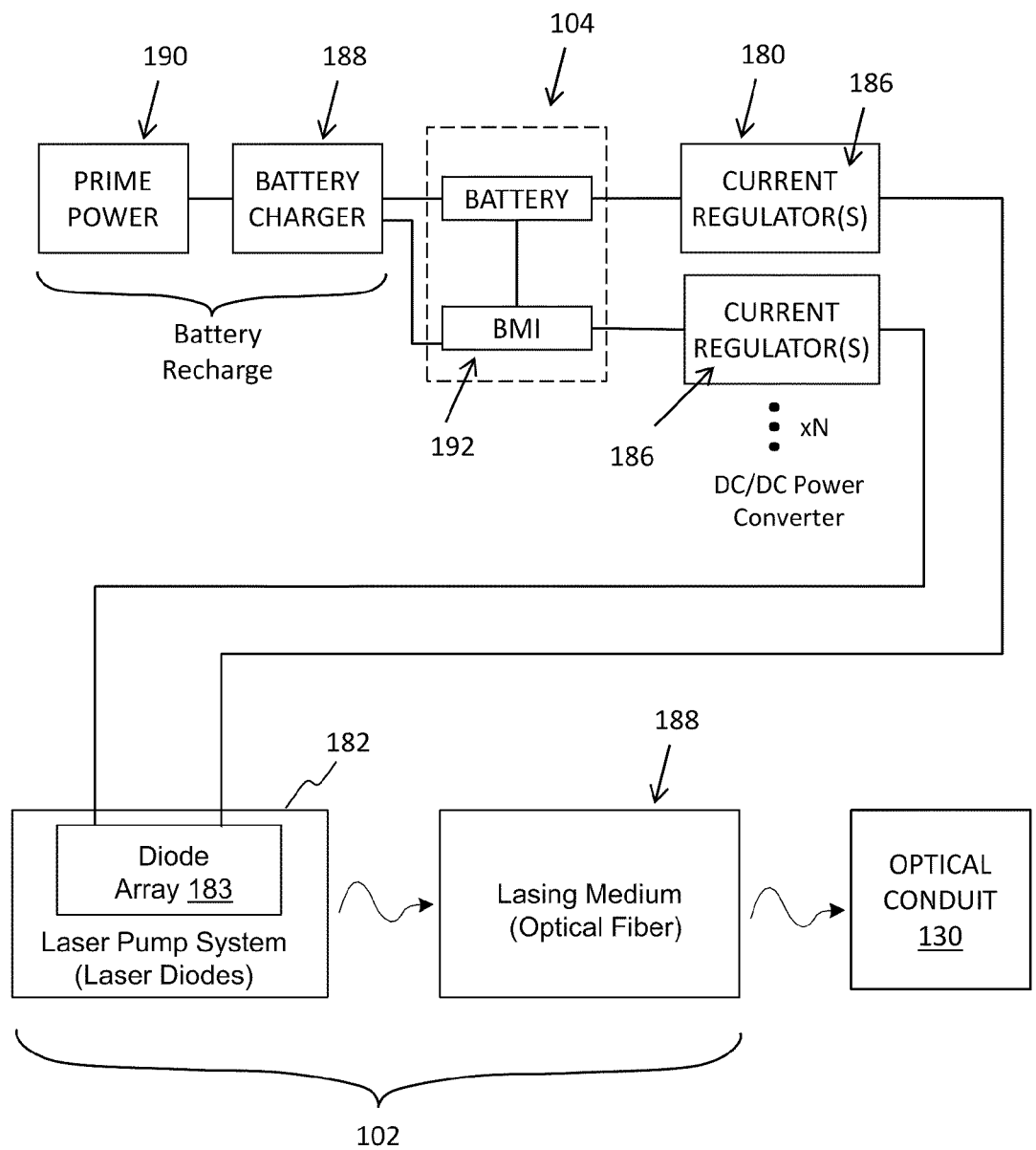
FIG. 10 illustrates a second arrangement of components of the portable cutting device.

Referring to either FIG. 9 or FIG. 10, laser source 102 is represented. Laser source 102 includes a laser pump system 182 which includes a plurality of laser diodes 183. Laser diodes 183 provide the pump energy for the lasing medium 184 of laser source 102. The laser diodes 183 are divided into a plurality of modules. In one embodiment, 42 diodes are provided in a single module and seven modules are provided. The lasing medium 184 is provided as part of a fiber optical cable. The output of the lasing medium 184 is provided to optical conduit 130.

In FIG. 9, power supply 104 is coupled to laser diodes 183 through DC driving circuit 180 which includes a single voltage regulator 181 that powers laser diodes 183. In FIG. 10, power supply 104 is coupled to laser diodes 183 through DC driving circuit 180 which includes a plurality of current regulators 186. Each current regulator 186 provides the power to one of the modules to provide power to the diodes of that module.

Referring to either FIG. 9 or FIG. 10, power supply 104 may be charged with a battery charger 188 coupled to prime power source 190. Exemplary prime power sources include a standard AC wall outlet or an alternator of a vehicle. Power supply 104 includes a battery management interface 192 which controls the recharging of the batteries with battery charger 188.

Figure 5:
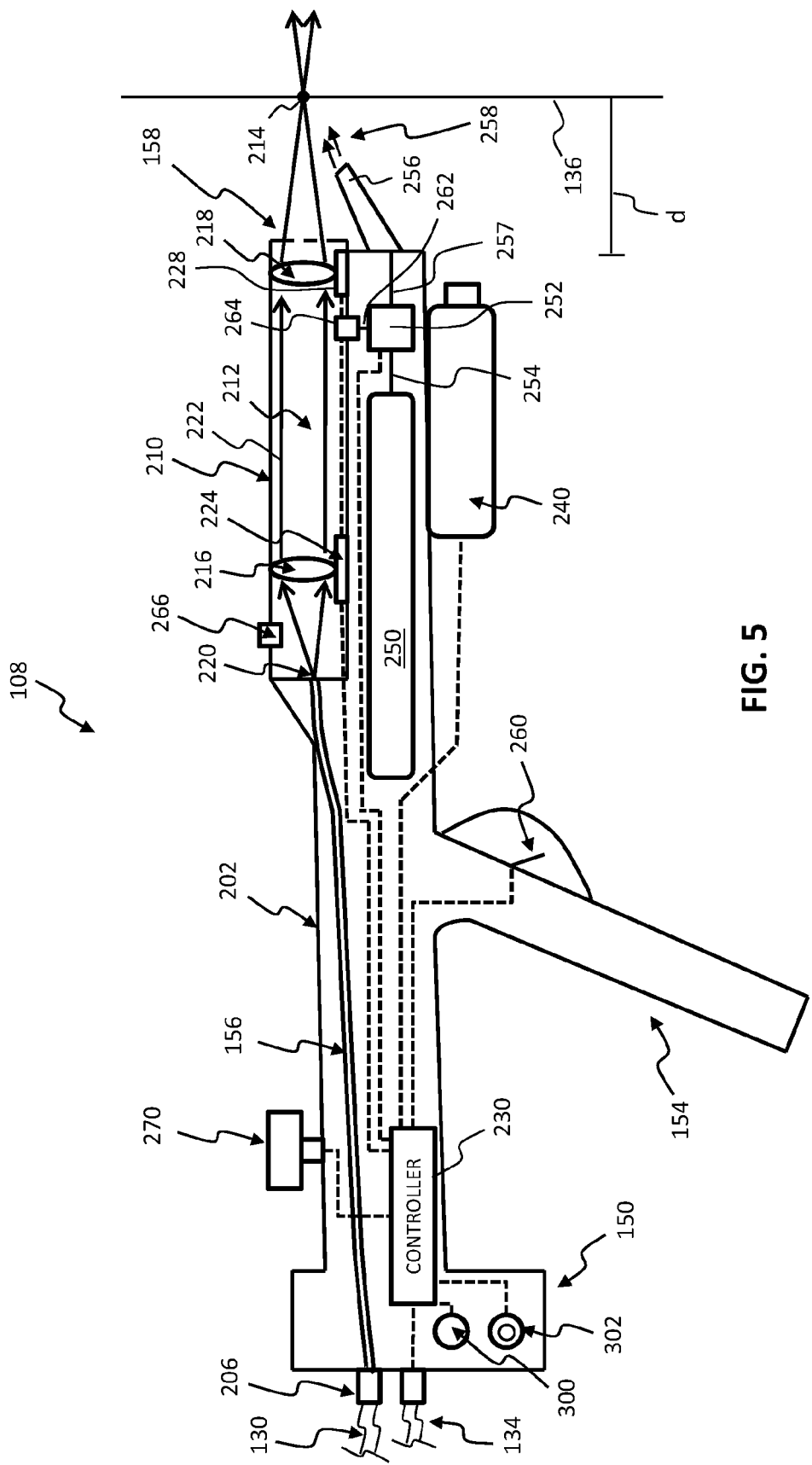
FIG. 5 is a representative view of a laser directing device of the portable cutting device of FIG. 2.

Referring to FIG. 5, an exemplary embodiment of laser directing device 108 is shown. Laser directing device 108 has a body 202 with a downwardly extending handle 204. Optical conduit 130 is coupled to an optical connector 206 which couples optical conduit 130 to optical conduit 208. Optical conduit 208 is coupled to a collimating chamber 210.

Collimating chamber 210 includes an optical system 212 which focuses light carried by optical conduit 208 at a focus 214 generally corresponding to the location of barrier 136. In one embodiment, the focal range of laser directing device 108 is from about six inches from end 158 to about sixty feet from end 158. In one embodiment, the focal range of laser directing device 108 is from about six inches from end 158 to about three kilometers from end 158.

In the illustrated embodiment, optical system 212 includes a first lens 216 and a second lens 218. First lens 216 receives the light from optical conduit 208 which acts like a point source. In the illustrated embodiment, first lens 216 is positioned such that an end 220 of optical conduit 208 is located at a focus of first lens 216 which results in a generally collimated beam 222 being produced inside of collimating chamber 210. Second lens 218 focuses collimated beam 222 at barrier 136. Although a two lens system is shown, other lens systems may be used to focus the light at focus 214.

The position of one or both of first lens 216 and second lens 218 may be altered relative to the position of end 220 of optical conduit 208 or the other of first lens 216 and second lens 218 to change the location of focus 214. In one embodiment, a portion of collimating chamber 210 is moveable relative to the remainder of collimating chamber 210 to allow an operator to manually adjust the relative spacing of first lens 216 and second lens 218 similar to a scope on a rifle. In one embodiment, first lens 216 is positioned on a moveable stand 224 and second lens 218 is positioned on a moveable stand 226. Both of moveable stand 224 and moveable stand 226 are controlled through respective motors to adjust the position of the respective first lens 216 and second lens 218.

The motors are controlled by a controller 230 of laser directing device 108. In one embodiment, controller 230 receives an input from an operator control (not shown) through which the operator specifies the desired position of focus 214. In one embodiment, controller 230 receives an input from a laser rangefinder 240 which determines the distance d from laser directing device 108 to barrier 136. Based on the determined distance d, controller 230 moves one or both of first lens 216 and second lens 218 to place focus 214 at distance d. In one embodiment, other locating devices may be used, such as GPS systems.

In one embodiment, instead of or in addition to a laser range finder device 240 includes a visible guide laser which provides a visible marker for the operator of where laser directing device 108 is going to cut. The visible guide laser should be collinear with an axis of collimating chamber 210. In one example, the visible guide laser is a HeNe laser. In one embodiment, laser source 102 acts as a guide laser. The operator wears goggles which can detect and provide a visible image of the barrier and the laser source at the barrier. In this embodiment, the laser source can be set to a low power setting to align with barrier and then set to a high power setting to cut barrier.

Laser directing device 108 also includes a compressed gas container 250 which provides air to a regulator valve 252 through a conduit 254. Regulator valve 252 provides gas to a nozzle 256 through a conduit 257. Nozzle 256 directs gas 258 at focus 214. In one embodiment, the position of nozzle 256 is adjustable. The gas blows molten material produced during cutting away from laser directing device 108, the operator, and away from barrier 136. Controller 230 controls regulator valve 252 to place conduit 257 in fluid communication with conduit 254 when a trigger 260 of laser directing device 108 is pulled by the operator. In one embodiment, the gas stored in compressed gas container 250 is a non-flammable gas. Exemplary gases include freon, nitrogen, argon, and other non-flammable gases.

Controller 230 also controls regulator valve 252 to place conduit 254 in fluid communication with a fluid conduit 262. Fluid conduit 262 terminates at a fluid inlet 264 to collimating chamber 210. The gas presented to collimating chamber 210 cools first lens 216 and second lens 218 from the heat generated by the light from optical conduit 208. Warmer gas in collimating chamber 210 is exhausted through a fluid outlet 266 of collimating chamber 210. In one embodiment, controller 230 controls regulator valve 252 to provide gas to fluid conduit 262 whenever trigger 260 is pulled. In one embodiment, controller 230 controls regulator valve 252 to provide gas to fluid conduit 262 when a temperature sensor monitoring collimating chamber 210 detects an elevated temperature.

Laser directing device 108 further includes a sensor 270 which monitors for light having generally the same wavelength provided by laser directing device 108 at focus 214. Sensor 270 monitors the intensity of the light reflected from barrier 136. Referring to FIG. 6A, when laser directing device 108 is generally normal to barrier 136, the light (represented by arrow 272) focused by laser directing device 108 strikes barrier 136 generally normal to barrier 136. A portion of the light (represented by arrow 274) is reflected by barrier 136. Often the reflected portion is small compared to the portion which interacts with barrier 136 to cut barrier 136 and as such does not pose a threat to the operator. However, when barrier 136 is more reflective the strength of the reflected portion increases. When a 1.07 micrometer wavelength beam is used, irradiance levels of about 5 milli-watts per square centimeter ($mW/cm^2$) pose a threat to the operator at any range less than 77 km, such as damage to the retina of the eye. At wavelengths less than 1.55 micrometer, light is transmitted into the eye which can damage the retina. In one embodiment, a laser source 102 having a wavelength of at least 1.55 micrometer is used. In one embodiment, a laser source 102 having a wavelength of about 2.0 micrometer is used. At wavelengths of 1.55 micrometer and greater, damage to the cornea of the eye is the concern. Since the cornea heals quite easily and the retina I generally permanently damaged, wavelengths which are absorbed by the cornea and not transmitted are considered to be "eye safe".

By monitoring the irradiance levels of the reflected portion with sensor 270, controller 230 may make a determination of actions to take. In one embodiment, if the irradiance levels of the reflected portion are above a first threshold, controller 230 sends an instruction to controller 105 to shut down laser source 102. In one embodiment, the first threshold is about 2.5 $mW/cm^2$.

In one embodiment, if the irradiance levels of the reflected portion are above a first threshold, controller 230 sounds an alarm which provides an indication to the operator that the irradiance levels of the reflected portion are elevated, but not at a threatening level. The operator may then move to the arrangement shown in FIG. 6B, wherein the light represented by arrow 272 is not normal to barrier 136; thereby causing the reflected light represented by arrow 274 to not be returned to sensor 270. However, if the irradiance levels are above a second threshold, controller 230 sends an instruction to controller 105 to shut laser source 102 down. In one embodiment, the first threshold is about 2.0 $mW/cm^2$ and second threshold is about 2.5 $mW/cm^2$.

This control sequence is represented in FIG. 7. The irradiance level of the reflected portion is monitored with sensor 270, as represented by block 280. The irradiance level is compared to a first threshold, as represented by block 282. If the irradiance level is below the first threshold, no action is taken and the irradiance level of the reflected portion is continued to be monitored with sensor 270. If the irradiance level is at or above the first threshold, then the irradiance level is compared to a second threshold, as represented by block 284. If the irradiance level is not at or above the second threshold, then an alarm is sounded, as represented by block 286. This informs the operator that irradiance levels are elevated and that action should be taken, such as changing the angle of incidence relative to barrier 136. Exemplary alarms include audio alarms (such as speakers), visual alarms (such as lights), tactile alarms (such as vibrating members), or combinations thereof. If the irradiance level is at or above the second threshold, then laser source 102 is deactivated, as represented by block 288.

Returning to FIG. 5, laser directing device 108 further includes a safety switch 300 and a laser power setting switch 302. Safety switch 300 provides a safety in case the operator inadvertently pulls trigger 260. Safety switch 300 may be a toggle switch, a dial, or any other suitable input device. Laser power setting switch 302 provides an indication of the desired power level of laser source 102. By running laser source 102 at lower power levels for applications not requiring high power settings, the charge life of power supply 104 may be extended. Laser power setting switch 302 may be any type of input devices which provides multiple settings, each corresponding to a particular power level. An exemplary input device is a dial. In one embodiment, the power level of laser source 102 may be adjusted from 0% to 100%.

Figure 8:
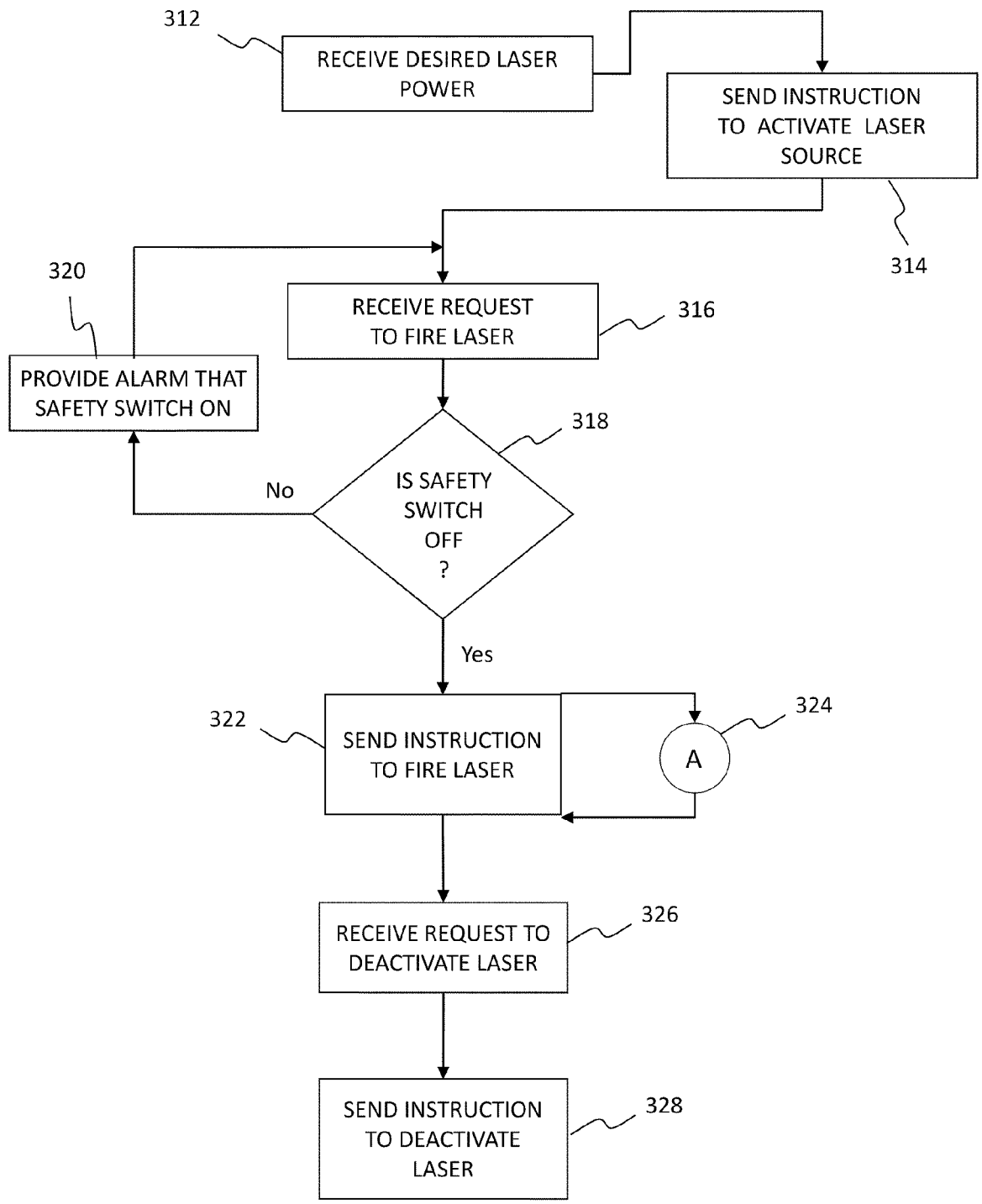
FIG. 8 illustrates another processing sequence of the controller of the portable cutting device.

Referring to FIG. 8, an exemplary operation sequence for laser directing device 108 is provided. A request is received by controller 230 to set the desired power level of laser source 102, as represented by block 312. For laser directing device 108, the request to set the desired power level of laser source 102 is the setting of laser power setting switch 302. Controller 230 sends an instruction to controller 105 to activate laser source 102 at the desired power level, as represented by block 314.

Controller 230 receives a request to fire laser source 102, as represented by block 316. For laser directing device 108, the request to fire laser source 102 is the pulling of trigger 260 which is monitored by controller 230. Controller 230 checks to see if the safety switch 302 is off, as represented by block 318. For laser directing device 108, the state of safety switch 300 is checked. If the safety switch is on, an alarm is provided to alert the operator that the safety is on, as represented by block 320. Exemplary alarms include audio alarms (such as speakers), visual alarms (such as lights), tactile alarms (such as vibrating members), or combinations thereof. If the safety switch is off, then controller 230 sends an instruction to controller 105 to fire laser source 102, as represented by block 322.

While laser source 102 is being fired, the monitoring sequence of FIG. 7 is carried out, as represented by block 324. Controller 230 receives a request to deactivate laser source 102, as represented by block 326. For laser directing device 108, the request to deactivate laser source 102 is the release of trigger 260 which is monitored by controller 230. Controller 230 sends an instruction to controller 105 to deactivate laser source 102, as represented by block 328.

With trigger 260 pulled, operator 120 moves laser directing device 108 with his/her arms to define the cutting path of laser directing device 108. As such, laser directing device 108 may be moved by human operator 120 without the need to also move laser source 102. This flexibility is provided in part by the flexibility of optical conduit 130. As represented in FIG. 2, a planned cutting path 162 is shown including a first portion 164 which has already been cut. Once cutting is complete, portable cutting device 100 may be powered off, by letting trigger 260 released. In between cutting operations, power supply 104 may be recharged or replaced.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A portable cutting device for transport by a human operator, comprising:
    a laser source which provides optical energy;
    a battery power source;
    a laser directing device supporting focusing optics in a collimating chamber, the focusing optics focus the optical energy provided by the laser source, wherein said laser comprises a fiber gain medium and at least one optical pump;
    at least one storage container, the at least one storage container housing the laser source and the battery power source; and
    a flexible optical conduit extending from an interior of the at least one storage container to the laser directing device, the optical conduit communicating the optical energy produced by the laser source to the laser directing device.

2. The portable cutting device of claim 1, wherein the laser source is a continuous wave laser.

3. The portable cutting device of claim 1, wherein the laser source is a continuous wave single mode fiber laser.

4. The portable cutting device of claim 1, wherein a power level of the optical energy provided by the laser source is at least 3 kilowatts.

5. The portable cutting device of claim 1, wherein the at least one storage container include a backpack which includes a cargo carrying portion housing the battery power source and the laser source and support straps through which arms of the human operator extend.

6. The portable cutting device of claim 1, wherein the laser directing device includes a stock portion and a grip, the optical conduit being coupled to the handheld laser directing device at one of the stock portion and the grip.

7. The portable cutting device of claim 1, wherein the battery power source includes a plurality of rechargeable batteries connected together in series.

8. The portable cutting device of claim 7, wherein the rechargeable batteries are selected from the group consisting of lithium-ion batteries and lithium polymer batteries.

9. The portable cutting device of claim 1, wherein the battery power source provides at least about 10 kilowatts of power for at least six minutes.

10. The portable cutting device of claim 1, wherein the portable cutting device provides sufficient power to cut through half inch steel at a rate of at least 50 inches per minute.

11. The portable cutting device of claim 1, wherein the focusing optics have an adjustable focal length.

12. The portable cutting device of claim 11, wherein the laser directing device includes a laser rangefinder which determines a distance to the barrier and a controller which adjusts the adjustable focal length of the focusing optics based on the determined distance.

13. The portable cutting device of claim 1, wherein the laser directing device includes a controller, a trigger, a compressed air container, a valve in fluid communication with the compressed air container, and a nozzle directed at a focus of the focusing optics and in fluid communication with the valve.

14. The portable cutting device of claim 13, wherein the valve is opened by the controller based on a status of the trigger to provide an air stream generally towards the focus of the focusing optics.

15. The portable cutting device of claim 13, wherein the laser directing device further includes a second fluid conduit in communication with the valve and in fluid communication with the collimating chamber, the controller controlling the valve to provide air from the compressed air container to the collimating chamber.

16. The portable cutting device of claim 1, wherein the laser directing device further includes a sensor which measures reflected optical energy from a barrier that is provided by the laser source.

17. The portable cutting device of claim 16, further comprising a controller portion, wherein the laser source is deactivated when the sensor detects optical energy above a first threshold stored in said controller portion.

18. The portable cutting device of claim 1, wherein the optical conduit is provided in a protective sheath.

19. The portable cutting device of claim 18, wherein the protective sheath further includes an electrical cable which couples a first controller positioned in the at least one storage container to a second controller of the laser directing device.

20. The portable cutting device of claim 1, further comprising a cooling unit positioned within the at least one storage container to cool the laser source.

21. The portable cutting device of claim 1, wherein said laser is a solid state laser.

22. The portable cutting device of claim 1, wherein said laser comprises a beam combination structure comprising a plurality of laser gain fibers which are coupled together in a single output.

23. The portable cutting device of claim 1, wherein said laser comprises a plurality of modules of fiber gain medium whose output are coupled together through a combiner.

24. A portable cutting device for transport by a human operator, comprising:
    a laser source which provides optical energy;
    a battery power source;
    a laser directing device adapted to output a continuous wave laser, wherein said laser directing device is adapted for supporting focusing optics in a collimating chamber comprising a defocusing optic and a focusing optic, the focusing optics focus the optical energy as a continuous wave provided by the laser source, wherein said laser comprises a fiber gain medium and at least one optical pump;
    at least one storage container, the at least one storage container housing the laser source and the battery power source; and
    a flexible optical conduit extending from an interior of the at least one storage container to the laser directing device, the optical conduit communicating the optical energy produced by the laser source to the laser directing device.

25. The portable cutting device of claim 24, wherein the laser source is a continuous wave laser.

26. The portable cutting device of claim 24, wherein the laser source is a continuous wave single mode fiber laser.

27. The portable cutting device of claim 24, wherein a power level of the optical energy provided by the laser source is at least 3 kilowatts.

28. The portable cutting device of claim 24, wherein the at least one storage container include a backpack which includes a cargo carrying portion housing the battery power source and the laser source and support straps through which arms of the human operator extend.

29. The portable cutting device of claim 24, wherein the laser directing device includes a stock portion and a grip, the optical conduit being coupled to the handheld laser directing device at one of the stock portion and the grip.

30. The portable cutting device of claim 24, wherein the battery power source includes a plurality of rechargeable batteries connected together in series.

31. The portable cutting device of claim 30, wherein the rechargeable batteries are selected from the group consisting of lithium-ion batteries and lithium polymer batteries.

32. The portable cutting device of claim 24, wherein the battery power source provides at least about 10 kilowatts of power for at least six minutes.

33. The portable cutting device of claim 24, wherein the portable cutting device provides sufficient power to cut through half inch steel at a rate of at least 50 inches per minute.

34. The portable cutting device of claim 24, wherein the focusing optics have an adjustable focal length.

35. The portable cutting device of claim 34, wherein the laser directing device includes a laser rangefinder which determines a distance to the barrier and a controller which adjusts the adjustable focal length of the focusing optics based on the determined distance.

36. The portable cutting device of claim 24, wherein the laser directing device includes a controller, a trigger, a compressed air container, a valve in fluid communication with the compressed air container, and a nozzle directed at a focus of the focusing optics and in fluid communication with the valve.

37. The portable cutting device of claim 36, wherein the valve is opened by the controller based on a status of the trigger to provide an air stream generally towards the focus of the focusing optics.

38. The portable cutting device of claim 36, wherein the laser directing device further includes a second fluid conduit in communication with the valve and in fluid communication with the collimating chamber, the controller controlling the valve to provide air from the compressed air container to the collimating chamber.

39. The portable cutting device of claim 24, wherein the laser directing device further includes a sensor which measures reflected optical energy from a barrier that is provided by the laser source.

40. The portable cutting device of claim 39, further comprising a controller portion, wherein the laser source is deactivated when the sensor detects optical energy above a first threshold stored in said controller portion.

41. The portable cutting device of claim 24, wherein the optical conduit is provided in a protective sheath.

42. The portable cutting device of claim 41, wherein the protective sheath further includes an electrical cable which couples a first controller positioned in the at least one storage container to a second controller of the laser directing device.

43. The portable cutting device of claim 24, further comprising a cooling unit positioned within the at least one storage container to cool the laser source.

44. The portable cutting device of claim 24, wherein said laser is a solid state laser.

45. The portable cutting device of claim 24, wherein said laser comprises a beam combination structure comprising a plurality of laser gain fibers which are coupled together in a single output.

46. The portable cutting device of claim 24, wherein said laser comprises a plurality of modules of fiber gain medium whose output are coupled together through a combiner.

* * * * *